Aug. 2, 1949. C. E. KERR 2,477,620
PULPING APPARATUS
Filed April 9, 1946 2 Sheets-Sheet 1
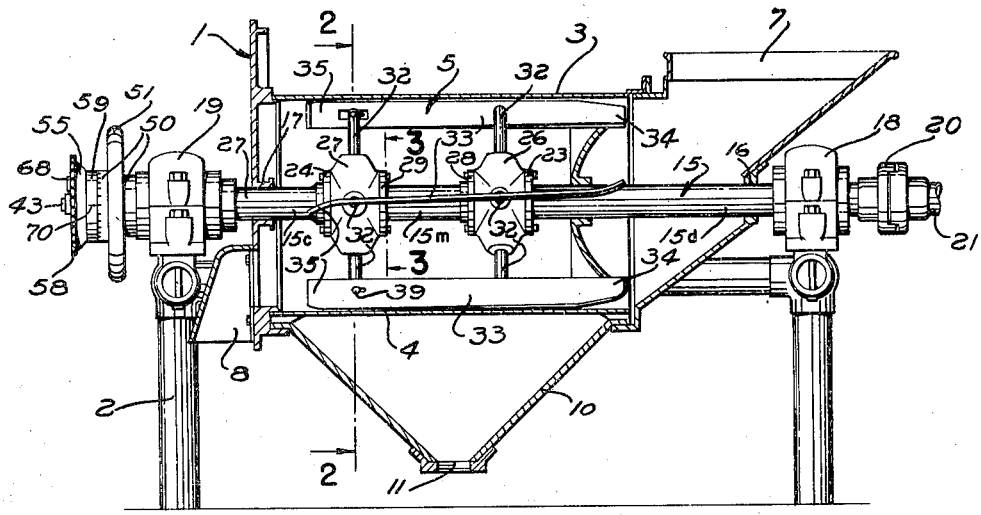
FIG_1  FIG_4
FIG_3
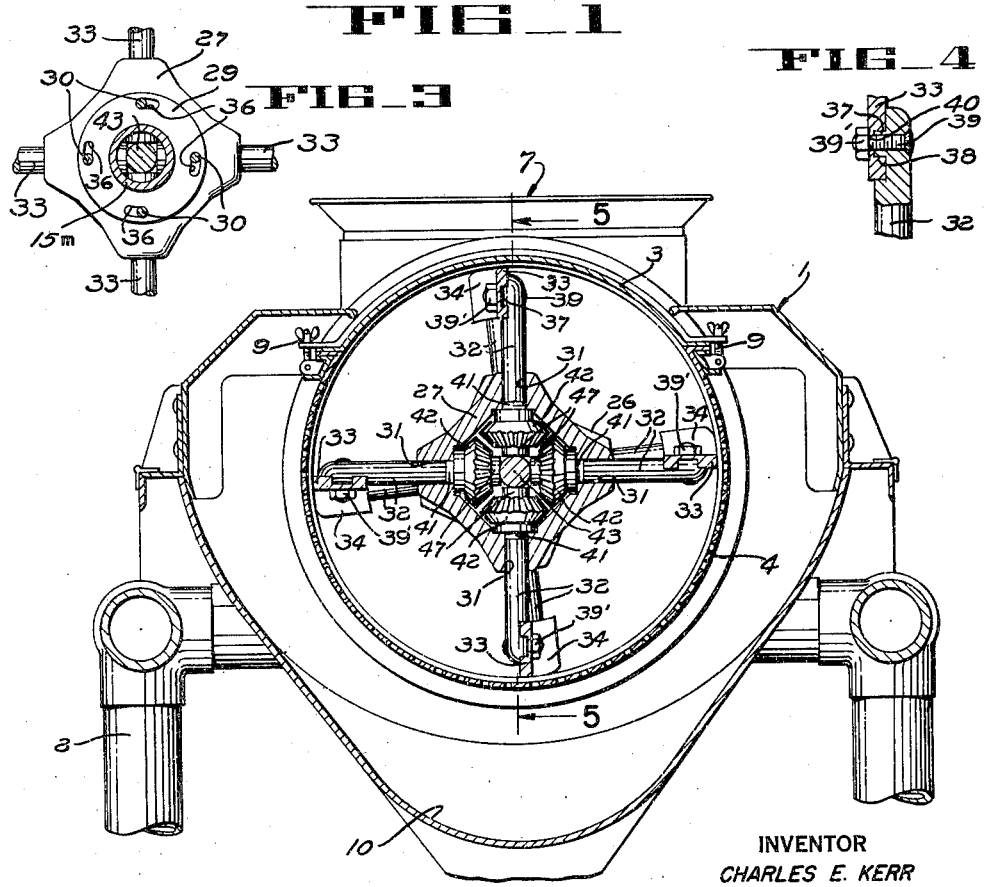
FIG_2
INVENTOR
CHARLES E. KERR
BY *Philip A. Minnis*
ATTORNEY Aug. 2, 1949. C. E. KERR 2,477,620
PULPING APPARATUS
Filed April 9, 1946 2 Sheets-Sheet 2
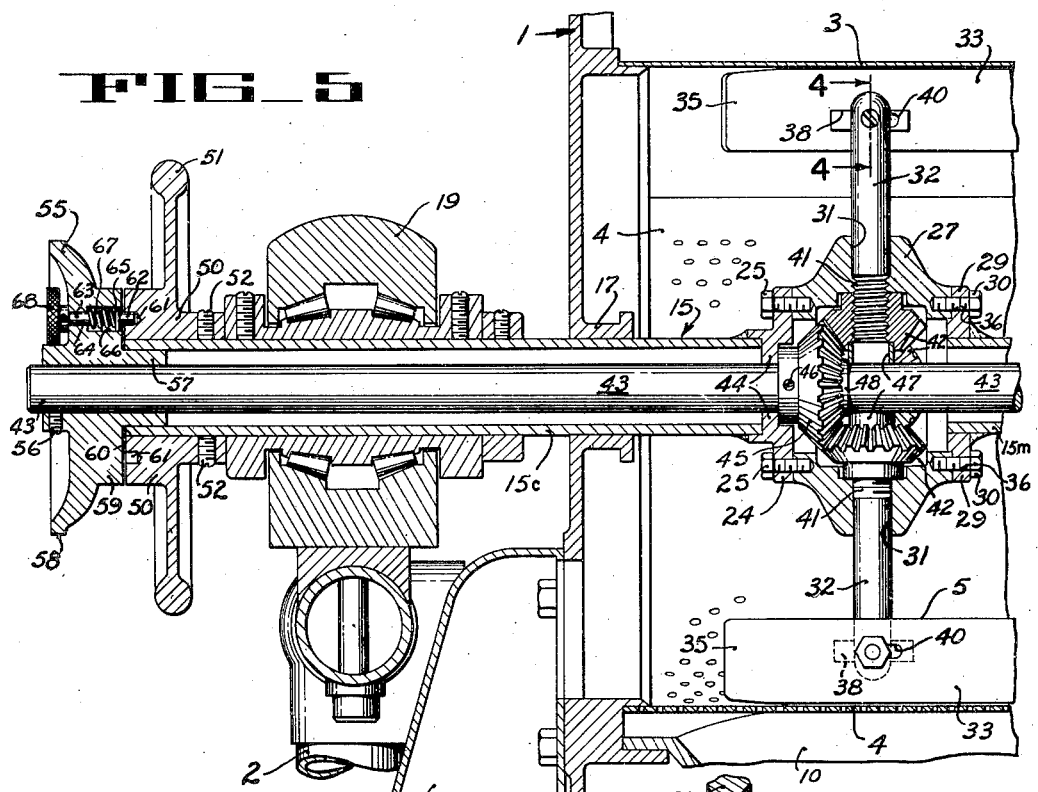
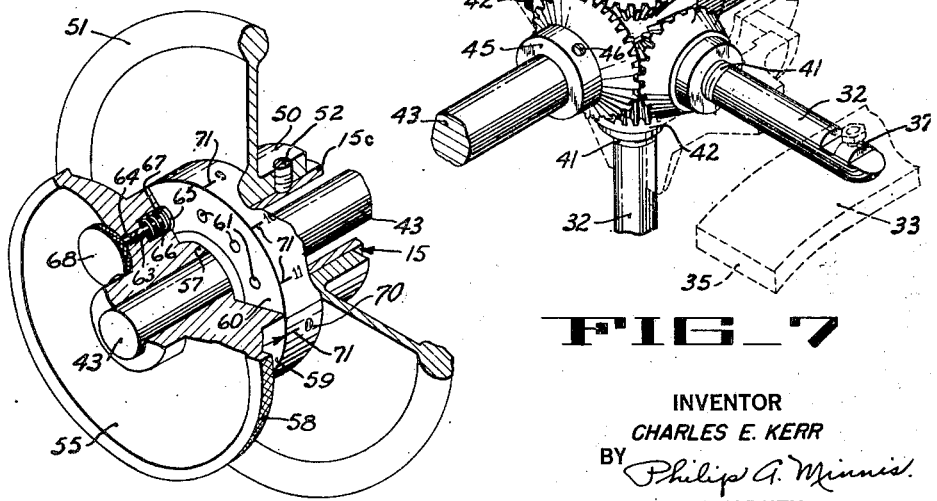
INVENTOR
CHARLES E. KERR
BY Philip G. Minnis
ATTORNEY Patented Aug. 2, 1949

2,477,620

UNITED STATES PATENT OFFICE 2,477,620

PULPING APPARATUS

Charles E. Kerr, Hoopeston, Ill., assignor to Food Machinery and Chemical Corporation, a corporation of Delaware Application April 9, 1946, Serial No. 660,775

5 Claims. (Cl. 146—174)

This invention relates to machines for pulping fruit and vegetable material such as tomatoes, pumpkins, berries, and citrous fruit, or the like.

One object of the present invention is to provide a unitary beater assembly in which the paddles of the beater are adjustable radially relative to a pulping drum to vary the spacing between the paddles and drum to suit the condition of the various types of material to be acted upon.

Another object of this invention is to provide a unitary control outside of the pulping machine for simultaneously adjusting all of the paddles of a beater assembly.

Another object is to provide an indicator outside the pulping drum for indicating the various positions of the paddles of the beater assembly relative to the pulping drum.

Other objects and advantages of the present invention will become more apparent from the following description and drawings in which:

Fig. 1 is a longitudinal section through a pulper embodying the present invention, certain parts being shown in elevation.

Fig. 2 is an enlarged cross section of Fig. 1 taken along line 2—2 thereof.

Fig. 3 is a section taken along line 3—3 of Fig. 1 showing a portion of the beater assembly in elevation.

Fig. 4 is an enlarged section of a paddle and supporting arm therefor, taken along line 4—4 of Fig. 5.

Fig. 5 is an enlarged longitudinal section of a portion of the machine showing the beater control and a portion of the beater assembly in section.

Fig. 6 is a perspective view of the control portion of the beater assembly, certain parts thereof being broken away while others are shown in section.

Fig. 7 is a fragmentary perspective view illustrating one paddle supporting unit of the beater assembly.

Referring to the drawings, 1 designates a pulper of conventional design including a supporting frame 2, a drum 3 having a screen 4, and a beater assembly 5 mounted for rotation within the drum. For purposes of the present application, a pulper similar to the one disclosed in U. S. Patent No. 2,101,620, issued to H. R. Lewis, December 7, 1937, is illustrated and since this patent clearly describes the pulper and its operation, only so much of the same will be given herein as necessary to an understanding of the present invention.

The pulper 1 is provided at one end with a hopper 7 through which material is fed into the drum 3 and at the other end with a chute 8 through which dross is discharged from the drum. The lower side wall of the drum is perforated to provide a screen which is removably secured in place by clamp and wing nuts 9, Fig. 2, to facilitate interchange of screens having different sized perforations for different kinds of material to be fed through the machine.

Disposed below the screen of the pulper is a pan 10 into which the juices and puréed material drop and this pan 10 has a discharge opening 11 at its lower end adapted to be connected to any suitable conduit or receptacle for collecting the finished product.

The beater assembly 5 is supported on a shaft 15 which extends longitudinally in the drum through packing glands 16 and 17 in the end walls of the same and the extreme ends of the shaft 15 are supported for rotation in bearings 18 and 19 mounted on the frame 2 as shown in Fig. 1. The shaft 15 is adapted to be coupled, as indicated at 20, to a drive shaft 21 connected to any suitable form of drive mechanism, not shown.

The shaft 15 is hollow and is preferably built up from separate tubular sections, namely, a drive portion 15d, a control portion 15c, and an intermediate portion 15m. The inner ends of the drive and control portions of the shaft 15 are provided with flanges 23 and 24, respectively, which are secured by bolts 25 to separate housings 26 and 27 and the intermediate portion 15m has a flange 28 at one end and a flange 29 at its other end secured by bolts 30 to the housings 26 and 27, respectively.

Both of the housings 26 and 27 are similar in construction and, therefore, like reference numerals will indicate like parts thereof. Each of these housings is provided with bearings 31 at quadrantal points relative to the drum and in each of these bearings is arranged an arm 32 for sliding movement radially within the drum. The outer end of corresponding arms 32 of the two housings 26 and 27 have a paddle 33 secured thereto and adapted to sweep along the inner wall of the drum 3 when the shaft 15 is rotated.

The paddles 33 may be of any desired shape well known in the art. In the present disclosure flat paddles have been shown having their ends 34 adjacent the hopper 7 curved in the direction of rotation of the beater so as to scoop the material from the hopper into the drum and having their other ends 35 curved in opposite direction to the ends 34 to sweep the dross from within the drum into the chute 8 for discharge therethrough.

Fig. 3 discloses a typical construction of all the flanges 23, 24, 28, and 29 each of which is provided with arcuate slots 36 through which the bolts 25 and 30, respectively, extend so that the beater can be twisted during assembly, i. e., the housing 26 can be turned slightly relative to the housing 27. The paddles are fixed to the arms 32 of the housing 27 and the arms 32 of the housing 26 are provided with lugs 37 fitting into a longitudinal groove 38 formed in the abutting face of their respective paddles and after turning the housings 26 and 27 relative to each other the paddles are secured to the respective lugs and arms by headed screws 39, each of which fits through an elongated slot 40 in the paddle and have a nut 39' threaded thereon (Fig. 4). The beater assembly thus formed is a rigid and complete whole which rotates with the shaft 15 within the drum 4, and since the housings 26 and 27 are turned relative to each other the paddles 33 are twisted, as shown in Figure 1, to cause the dross in the drum to move toward the discharge chute 8 when the beater is rotated.

The inner end 41 of each arm 32 (Figs. 3 and 5) is threaded and fits into a threaded opening in a bevel gear 42 disposed within the housing 26 or 27, as the case may be. Arranged in the tubular shaft 15 is a control shaft 43 rotatably supported coaxially of the shaft 15 in bearings 44 formed in the flanges 24 and 28 of the control portion 15c and the intermediate portion 15m of the shaft, respectively. Disposed in each housing 26 and 27 is a beveled pinion gear 45. Each gear 45 is mounted on the shaft 43 and secured thereto for rotation therewith by a set screw 46 and each pinion gear 45 meshes with each of the several bevel gears 42 within the respective housing so as to simultaneously act upon all of the bevel gears 42 when the shaft 43 is turned with respect to the shaft 15. Each bevel gear 42 (Figs. 2 and 3) has a ferrule 47 press-fit into its inner end and engaging the shaft 43 to maintain the several bevel gears in spaced relation with respect to the shaft. The pinion gear 45 also has a ferrule 48 press-fit into its inner end to bear against the periphery of the several ferrules 47 on the gears 42 to thereby maintain the pinion gear 45 in proper position within the housing and in mesh with the bevel gears 42 therein.

The free end of the control portion 15c of the shaft 15 extends beyond the bearing 19, Fig. 5, and has the hub portion 50 of a disc wheel 51 secured thereto by a set screw 52. The control shaft 43 extends slightly beyond the end of the shaft 15 and has a hand wheel 55 secured thereto by a set screw 56. This hand wheel is provided with a sleeve portion 57 which extends into the tubular control portion 15c of the shaft 15 to maintain the shaft 43 concentric within the same. The hand wheel 55 is provided with a knurled rim 58 and a hub portion 59 having the same outside diameter as the hub 50 of the disc wheel 51 and abutting against the face 60 of the same.

The face 60 of the hub portion 50 is provided with a plurality of equally spaced holes 61 adapted to receive the end 62 of an index pin 63 which is slidably mounted in a bored opening 64 in the hub portion 59 of the hand wheel 55. The index pin 63 has a collar 65 thereon arranged in an enlarged portion 66 of the opening 64 in which a compression spring 67 encircling the pin 63 and bearing against the collar 65 is disposed to urge the pin toward the disc wheel 51. A knob 68 is secured to the free end of the index pin to provide a hand grip for withdrawing the pin against the action of the spring 67 to thereby permit turning of the hand wheel relative to the disc wheel.

Upon turning the hand wheel with respect to the disc wheel, the control shaft 43 is rotated relative to the shaft 15 whereby the beveled pinion gears 45 and the bevel gears 42 in the housings 26 and 27 are rotated. Since the ferrules 47 rest against the shaft 43 and hold the bevel gears 42 against radial movement within the housings, the rotation of the gears 42, causes the arms 32 to slide within the bearings 31 of the housing. Consequently, all four paddles of the beater assembly are simultaneously moved either outwardly or inwardly with respect to the shaft 15 to change the spacing between the paddles 33 and the screen 4. Movement of the paddles toward the screen is limited by engagement of the paddles with the screen and movement of the paddles away from the screen is limited by engagement of the inner end of the arms 32 with the shaft 43.

The pitch of the threads on the arms 32 and bevel gears 42 and the gear ratio of the teeth of the bevel gears 42 and pinion gears 45 are such that the arms 32 will be extended or retracted a predetermined distance dependent upon the relative turning of the hand wheel 55 with respect to the disc wheel 51. In other words, when the hand wheel 55 is moved to carry the index pin 63 from one hole 61 to the next or adjacent hole 61 in the face 60 of the disc wheel, the paddles will be moved within the drum a predetermined distance radially, thus making it possible to know definitely the exact spacing between the paddles and the inner face of the drum.

To assist an operator in setting the paddles relative to the drum, the hub portion 59 of the hand wheel is provided with an index arrow 70 pointing toward the adjacent hub 50 which has a plurality of markings 71 thereon corresponding to the spacing of the holes 61 in the face 60 of the hub 50. Each mark 71 has a numeral associated therewith for indicating the relative position of the indexing pin 63 with respect to the disc wheel, and this in turn indicates to the operator the spacing between the paddles 33 and the screen 4 so that the paddles can, with certainty, be set in a position suitable to pulp a particular material which is to be run through the pulping machine.

With the foregoing beater assembly it is a simple matter to initially set the paddles properly spaced from the screen 4 to break down the fiber of the material to be acted upon and to assure a proper pulping of such material in conjunction with the perforated screen. It is, therefore, apparent that as the batches of material are varied, the paddles of the beater assembly can be quickly reset by a common control exteriorly of the drum without dismantling the machine or otherwise holding up continuous production during the season.

While I have described the particular form of construction adapted to fulfill the objects of the present invention, it will be understood that various modifications and alterations may be resorted to without departing from the spirit of the invention. I, therefore, desire to avail myself of all modifications and alterations coming within the scope of the accompanying claims.

What I claim as new and desire to protect by Letters Patent is:

1. In a pulping machine having a perforated drum, a beater assembly comprising a hollow shaft, means for rotating said shaft, a plurality of paddles each having a pair of radially disposed arms, said shaft having a pair of housings formed thereon in spaced relation for slidably supporting the radially disposed arms of said paddles, each said arm having a threaded inner end, a bevel gear threaded on the inner end of each of said arms and supported within said housings, a pinion gear in each of said housings interconnecting the bevel gears therein, and means for turning said pinion and bevel gears for simultaneously moving said arms and paddles radially with respect to said drum.

2. In a pulping machine having a perforated drum, a beater assembly comprising a hollow shaft mounted for rotation coaxially in said drum, means for rotating said shaft, a plurality of paddles each having a radially disposed arm at each end thereof, said shaft having housings formed thereon for slidably supporting said radially disposed arms, each of said arms having a threaded inner end, a bevel gear threaded on the inner end of each said arms within each said housing, a beveled pinion gear in each housing interconnecting the bevel gears therein, means for turning said pinion gears for simultaneously extending or withdrawing said arms and paddles with respect to the perforated drum, and means on said turning means and associated with said shaft for indicating the relative spacing between the paddles and the drum.

3. In a pulping machine having a perforated drum and a beater assembly including a plurality of blades adapted to sweep material against the inside wall of said drum, means for moving said blades toward and away from the inside wall of the drum comprising an arm at each end of each of said blades having a threaded inner end, means for supporting the inner ends of said arms for radial sliding movement relative to said drum, a tubular shaft rotatably mounted in said drum for carrying said arm supporting means, a control shaft supported within said tubular shaft for rotation relative thereto, a bevel gear threaded on the inner end of each of said arms disposed between said arm supporting means and the control shaft for preventing radial movement of the bevel gears relative to said shaft, a pair of pinion gears secured to said control shaft for interconnecting the bevel gears within each arm supporting means for simultaneous rotation, and means associated with said control shaft accessible exteriorly of said drum for turning said control shaft independently of said tubular shaft for imparting radial movement to said arms and the blades.

4. In a pulping machine having a perforated drum adapted to receive material to be pulped and a beater including a plurality of blades for sweeping material against the inner wall of said drum, means for moving said blades toward and away from the inner wall of said drum comprising an arm at each end of said blades radially disposed in said drum, means for supporting said arms for radial sliding movement relative to said drum, a tubular shaft rotatably mounted in said drum for carrying said arm supporting means, a control shaft coaxially disposed within said tubular shaft for rotation with respect thereto, a bevel gear threaded on the inner end of each of said arms and maintained in radial disposition between said arm supporting means and the control shaft, a pair of pinion gears secured to said control shaft for meshing engagement with the bevel gears at the respective ends of said tubular shaft, a hand wheel at one end of said tubular shaft operatively connected to said control shaft, a hub secured to said tubular shaft having a plurality of indexing holes, and yieldable means on said hand wheel for interlocking the same in various positions of rotative adjustment with respect to the indexing holes in said hub for changing the spacing between said blades and the inner wall of said drum.

5. A beater for a pulping machine having a drum with perforations in its side wall, said beater comprising a tubular shaft extending longitudinally in said drum, means for driving said shaft, said shaft having a housing formed adjacent each end thereof within said drum, a plurality of blade supporting arms extending from each of said housings and adapted to slide radially therein, a blade supported on the outer ends of corresponding arms of said housings, said arms each having threaded inner ends disposed within their respective housings, bevel gears rotatably supported within said housings each threadedly associated with the threaded ends of a respective one of said arms, and a hand controlled means extending through said tubular shaft including a pinion gear within each of said housings for simultaneously driving the bevel gears therein to thereby slide said arms relative to said housings for moving said blades nearer to or spacing them farther from the curved side wall of said drum.

CHARLES E. KERR.

REFERENCES CITED

The following references are of record in the file of this patent:

UNITED STATES PATENTS

| Number | Name | Date |
|---|---|---|
| 293,159 | Gilbert | Feb. 5, 1884 |
| 1,104,631 | Cornwall | July 21, 1914 |
| 2,101,620 | Lewis | Dec. 7, 1937 |
| 2,142,649 | Lindley | Jan. 3, 1939 |

FOREIGN PATENTS

| Number | Country | Date |
|---|---|---|
| 308,110 | Germany | Sept. 30, 1918 |
| 490,362 | Great Britain | Aug. 12, 1938 |